United States Patent
Hashiguchi (10) Patent No.: US 8,363,143 B2
(45) Date of Patent: Jan. 29, 2013

(54) VIEW FINDER DEVICE, FIXTURE ADAPTER FOR THE SAME

(75) Inventor: Kentaro Hashiguchi, Tsushima (JP)

(73) Assignee: Nihon Video System Co., Ltd, Tsushima-shi Aichi (JP)

( * ) Notice: Subject to any disclaimer, the term of this patent is extended or adjusted under 35 U.S.C. 154(b) by 298 days.

(21) Appl. No.: 12/909,886

(22) Filed: Oct. 22, 2010

(65) Prior Publication Data

US 2011/0181766 A1 Jul. 28, 2011

(30) Foreign Application Priority Data

Jan. 22, 2010 (JP) ................................ 2010-026964
Mar. 24, 2010 (JP) ................................ 2010-067354
Jun. 15, 2010 (JP) ................................ 2010-136605

(51) Int. Cl.
*H04N 5/222* (2006.01)
*H04N 5/232* (2006.01)
*H04N 5/268* (2006.01)

(52) U.S. Cl. ................. 348/333.01; 348/211.8; 348/705

(58) Field of Classification Search ............... 348/211.5, 348/211.7, 211.8, 211.13, 333.01, 564, 565, 348/705, 706, 333.06, 333.07; 352/6, 7
See application file for complete search history.

(56) References Cited

U.S. PATENT DOCUMENTS

| 5,325,202 | A | * | 6/1994 | Washino | 348/222.1 |
| 5,450,140 | A | * | 9/1995 | Washino | 348/722 |
| 5,719,622 | A | * | 2/1998 | Conway | 348/211.8 |
| 5,854,654 | A | * | 12/1998 | Zwahlen et al. | 348/159 |
| 6,161,933 | A | * | 12/2000 | Tschida et al. | 352/179 |
| 6,587,141 | B1 | * | 7/2003 | Tanaka | 348/211.99 |
| 6,819,867 | B2 | * | 11/2004 | Mayer et al. | 396/56 |
| 7,327,959 | B2 | * | 2/2008 | Pelletier et al. | 398/139 |
| 7,486,308 | B1 | * | 2/2009 | Kori et al. | 348/143 |
| 7,880,806 | B2 | * | 2/2011 | Maeda | 348/373 |
| 2003/0169329 | A1 | * | 9/2003 | Parker et al. | 348/14.05 |
| 2005/0053352 | A1 | * | 3/2005 | McKain et al. | 386/46 |
| 2008/0055452 | A1 | * | 3/2008 | Carlson | 348/333.01 |
| 2008/0198255 | A1 | * | 8/2008 | Kirihara et al. | 348/341 |
| 2010/0141845 | A1 | * | 6/2010 | Kikkawa et al. | 348/706 |
| 2011/0068911 | A1 | * | 3/2011 | Nix et al. | 340/435 |

* cited by examiner

*Primary Examiner* — John Villecco
(74) *Attorney, Agent, or Firm* — Shalom Wertsberger; Saltamar Innovations (57) ABSTRACT

A view finder device for enabling an ordinary video camera to be used for broadcast use. The view finder device includes a control signal input for receiving control signals including a video-select signal; a camera video signal input for receiving a camera video signal from a video camera; an interrupt video signal input for receiving an interrupt video signal from a video interrupt source which is different from the video camera; a video selector for displaying either the camera video signal or the interrupt video signal, according to the video-select signal; a display controller for controlling display of a video selected by the video selector; and a control signal output for outputting the control signals after the video-select signal is removed therefrom.

12 Claims, 12 Drawing Sheets

Fig. 16

VIEW FINDER DEVICE, FIXTURE ADAPTER FOR THE SAME

CROSS-REFERENCE TO RELATED APPLICATION

This application claims priority to Japanese Patent Applications No. 2010-26964 filed on Jan. 22, 2010, No. 2010-67354 filed on Mar. 24, 2010, an No. 2010-136605 filed on Jun. 15, 2010 the disclosures of which are incorporated by reference in their entirety.

BACKGROUND OF THE INVENTION

The present invention relates to a view finder device (a video display device) mounted to a video camera, and more particularly to a view finder device which is capable of switching a video displayed on a display between a video of a camera video signal from a video camera and a video of an interrupt video signal (a return signal from a video interrupt source such as a video switcher).

In general, a plurality of broadcast-grade video cameras are connected to a video switcher when a TV program is recorded or broadcasted. An operator of the switcher views video feeds from the plurality of video cameras at the same time, and determines which of the video feeds will be used for the TV program. In order to create an interesting TV program, it is necessary for example to obtain a zoomed-in video of a subject and a video of the entire area of the scene to express the on-site presence. In order to obtain videos with various views, camera operators are required to spontaneously decide which video image should be sent to the switcher. For this purpose, a function is provided, which enables the camera operator to view the video feed currently being chosen by the switcher. This function allows the camera operator to acquire video image with a view which is different from the one currently being chosen by the switcher. Therefore, a broadcast-grade video camera, in general, is configured to receive an input from the switcher, and includes a function to switch between a video currently being acquired by the camera (hereinafter, referred to as "current video") and a return video from the switcher (hereinafter, referred to as "return video"), generally, by pushing a video-select button provided on a lens mounted on the video camera or pushing a video-select button provided on a zoom remote controller which is connected to the lens.

SUMMARY OF THE INVENTION

Nowadays, performance of a video camera has improved, and thus it has become possible to acquire a high-quality video which can be used for broadcast by an ordinary, consumer grade camera, which is cheaper than a very expensive broadcast-grade-video camera.

However, such ordinary consumer grade camera is not designed for broadcast use, and thus does not receive a return video. Therefore, even though the video quality of such video camera is sufficiently high, the ordinary video camera use in the broadcast field has been limited.

The present invention has been made in view of such circumstances, and provides a view finder device which enables a user to use an ordinary video camera for broadcast use.

According to the preferred invention, provided is a view finder device including: a control signal input for receiving control signals including a video-select signal; a camera video signal input for receiving a camera video signal from a video camera; an interrupt video signal input for receiving an interrupt video signal from a video interrupt source which is different from the video camera; a video selector for displaying either the video of the camera video signal or the video of the interrupt video signal, based on the video-select signal; a display controller for controlling display of a video selected by the video selector; and a control signal output for outputting the control signals after the video-select signal is removed therefrom.

The view finder device of the preferred embodiment is primarily intended to be used with a video camera which has a function to switch between a video previously recorded by the video camera ("right-before video") and a currently acquired video ("current video"), by use of a remote controller. In such a video camera, the current video and the right-before video are switched based on a video-select signal (also called as "return signal") from a remote controller. Typically output from the remote controller includes not only the video-select signal, but also control signals for zoom adjustment, start/stop of recording, and the like. These signals are generally referred to as "control signals."

In the preferred embodiment, the control signals outputted from the remote controller and including the video-select signal are inputted into the view finder device of the preferred embodiment, instead of being inputted into the video camera. The view finder device of the preferred embodiment includes a camera video signal input, and an interrupt video signal input, and displays a video signal inputted into either of these inputs based on the video-select signal from the remote controller. According to this configuration, when a return video from the switcher is inputted into the interrupt video signal input, the current video or the return video can be selected by use of the remote controller. Therefore, according to the preferred embodiment, an ordinary video camera which cannot receive a return video can be used for broadcast use.

The switching between the current video and the return video is possible according to the above-mentioned configuration. However, one problem remains. Because the control signals outputted from the remote controller are inputted into the view finder device of the preferred embodiment instead of the video camera, control signals, other than the video-select signal, are also inputted into the view finder device, and as a result, it becomes impossible to adjust the zoom and switch start/stop of recording by use of the remote controller. In order to solve this problem, the control signals are outputted from the view finder device, except for the video-select signal. According to such configuration, the control signals can be inputted into the video camera, and thus the above problem is solved. The video-select signal is removed from the outputted signals from the view finder device. This is because, if the video-select signal is inputted into the video camera which has a function to switch between a right-before video and a current video, the video camera stops recording a current video and outputs a right-before video when a video-select button is pushed to check a return video.

As mentioned above, by use of a view finder device of the preferred embodiment, it becomes possible to use an ordinary video camera, which itself cannot receive a return video, for broadcast use.

The view finder device of the preferred embodiment can be used not only with a video camera with a digital video signal output, but also with a video camera with an analog video signal output by using a digital signal converter. Furthermore, the view finder device of the preferred embodiment can also be used with an ENG video camera, and in addition can be used as a view finder device for a studio video camera.

The view finder device of the preferred embodiment may further include a video signal output for outputting a video selected by the video selector. In this case, a video displayed on a display can be outputted and used for recording and broadcasting. The video displayed on the display can be switched by use of a remote controller. Therefore, the view finder device can be used as a switcher by inputting, into the interrupt video signal input, a video from another video camera or a video from a video reproduction apparatus which reproduces a recorded video. For example, when the view finder device of the preferred embodiment is mounted on a first video camera, and a second video camera is fixed on a remote location (for example, in a way that the second video camera records a view with the entire scene), a video displayed on a display of the view finder device can be selected, by a remote controller, from the video signals of the first and second video cameras, and the displayed video can be outputted from the view finder device. Therefore, a program including videos of both of the first and second cameras can be easily created. By use of the view finder device of the preferred embodiment, even when several video cameras are used for recording, a switcher becomes unnecessary, and thus the burden of carrying a switcher apparatus, and the labor costs for an operator of the switcher can be reduced.

DESCRIPTION OF THE PREFERRED EMBODIMENTS

Hereinafter, a view finder device according to an embodiment of the present invention will be explained with reference to FIGS. 1 to 6. The present invention is not limited to an embodiment shown below.

Figure 1:
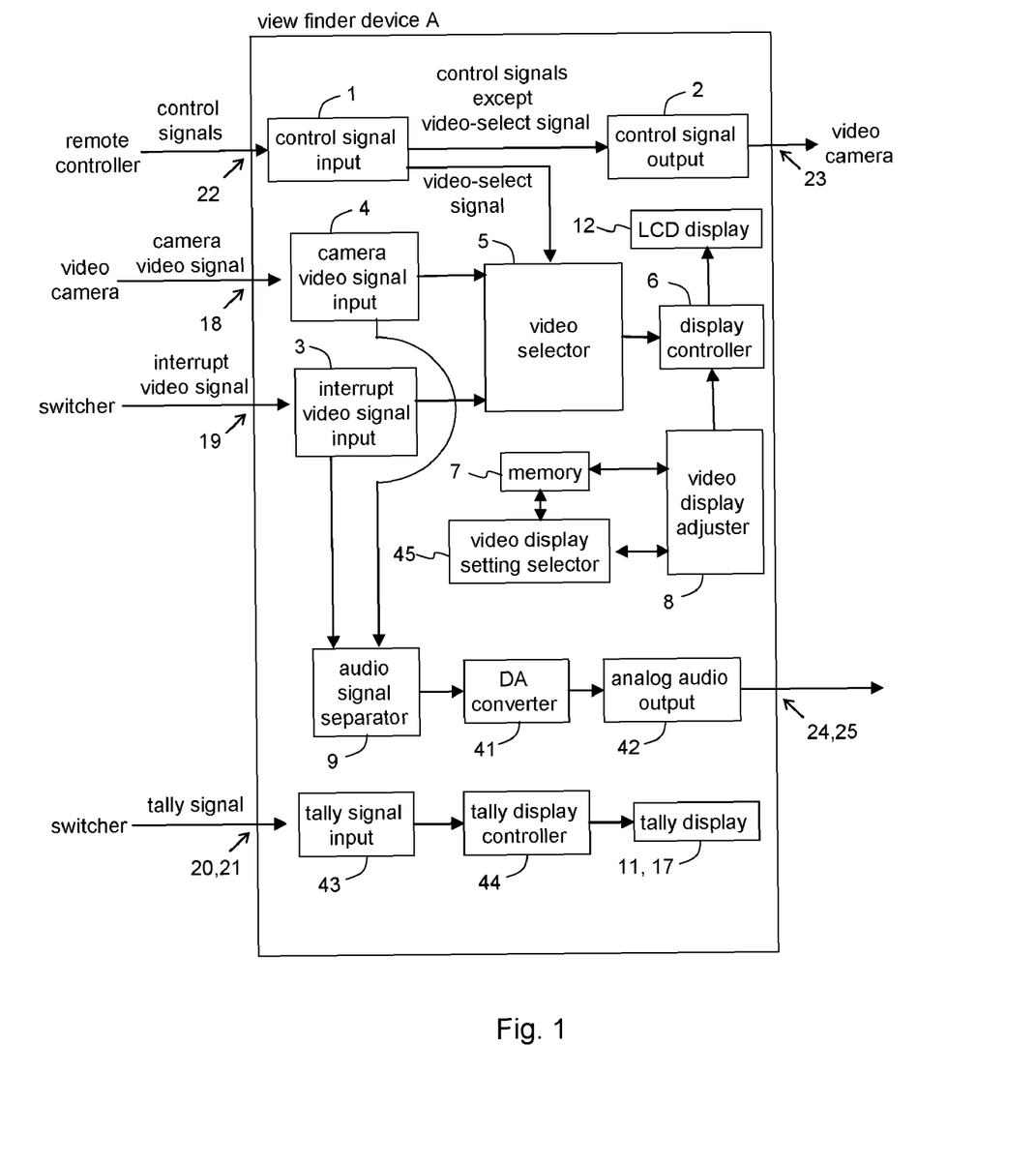
FIG. 1 is a block diagram illustrating an internal configuration of a view finder device of an embodiment of the present invention.
Figure 2:
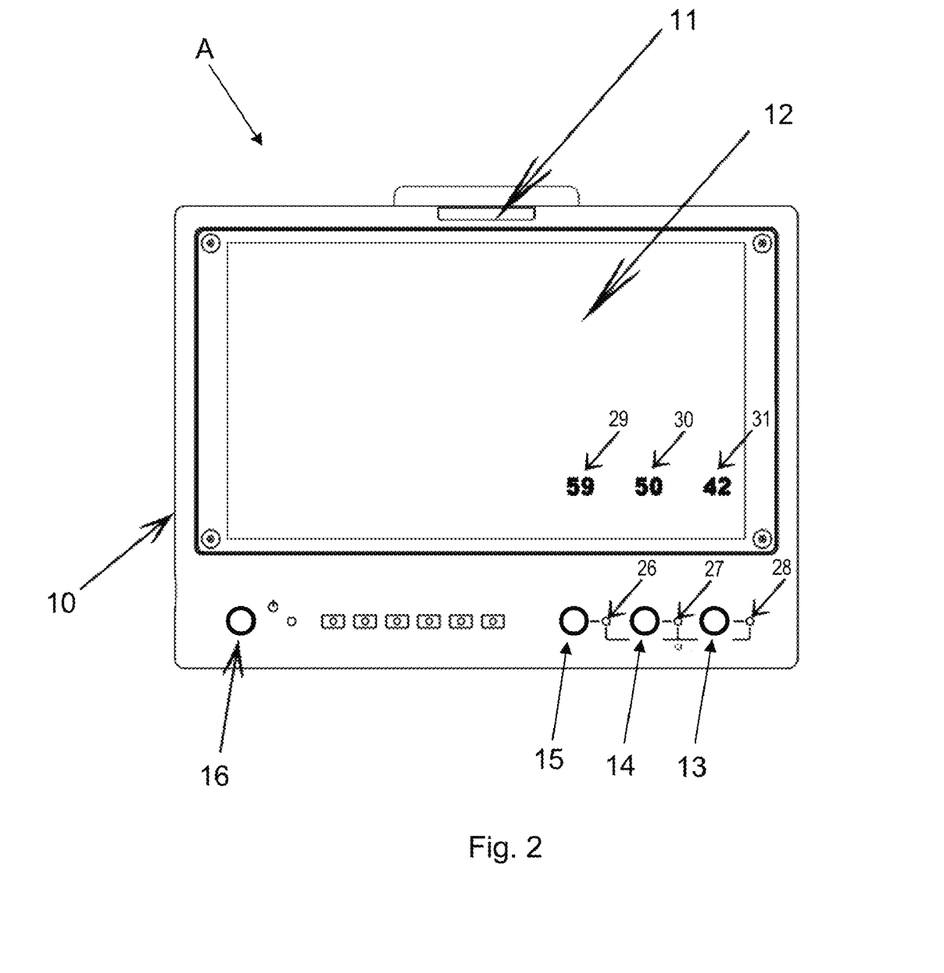
FIG. 2 is a front view illustrating a view finder device of an embodiment of the present invention.
Figure 3:
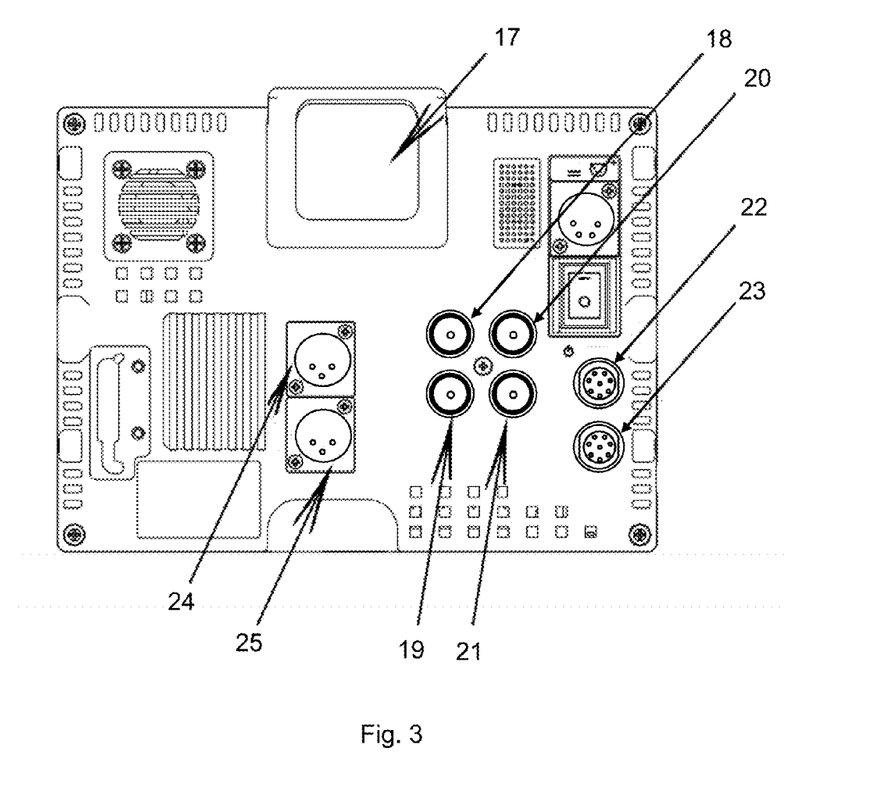
FIG. 3 is a backside view illustrating a view finder device of an embodiment of the present invention.

FIG. 1 is a block diagram illustrating an internal configuration of a view finder device A of the present embodiment. FIGS. 2 and 3 show an example of an appearance, and configurations of connectors and a display of the view finder device A. FIGS. 2 and 3 are a front view and a rear view, respectively.

Internal Configuration of View Finder Device A

Now, with reference to FIG. 1, an internal configuration of the view finder device A is described.

Figure 5:
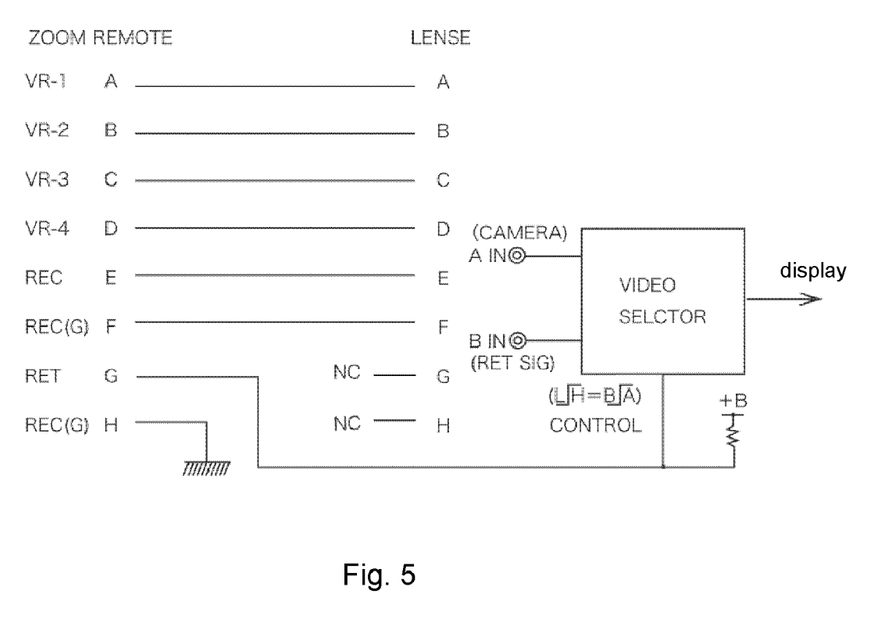
FIG. 5 is a simplified schematic diagram illustrating a configuration of an operation circuit for a video selector in a view finder device of an embodiment of the present invention.

The view finder device A includes a control signal input 1 for receiving control signals including a video-select signal; a camera video signal input 4 for receiving a camera video signal from a video camera; an interrupt video signal input 3 for receiving an interrupt video signal from a video interrupt source (ex. switcher) which is different from the video camera; a video selector 5 for displaying either a video of the camera video signal or a video of the interrupt video signal, based on the video-select signal; a display controller 6 for controlling display of a video selected by the video selector; and a control signal output 2 for outputting the control signals after the video-select signal is removed therefrom. According to such configuration, a camera video and a return video can be switched by use of a remote controller. The video selector 5, for example, selects a camera video when the video-select signal is H (high) and selects a return video when the video-select signal is L (low). FIG. 5 shows an example of a simplified schematic diagram to output signals generated by removing the video-select signal from the control signals. In the present specification, a video signal may be a composite signal, an HD-SDI signal, an SD-SDI signal, an HD-component and so on, depending on signals used in the video camera.

The control signal input 1 is preferably configured such that a zoom remote controller for a video camera is directly coupled thereto. In this case, a special adapter is not required to couple the zoom remote controller to the view finder device A, and thus the configuration is simple.

Video signals are preferably inputted into the camera video signal input 4 and the interrupt video signal input 3 through a BNC connector. A conventional view finder, in general, is dedicated to a specific video camera, and special connectors are used. Therefore, it is difficult to use a view finder from a camera of one type with a camera of a different type. In contrast, because BNC connectors, which are universal, are used for the camera video signal input 4 and the interrupt video signal input 3, the view finder device A can be used with various video cameras.

Furthermore, the view finder device A preferably includes a tally signal input 43 for receiving a tally signal from the interrupt video signal; a tally display 11 for emitting light with a plurality of colors; and a tally display controller 44 for controlling display of the tally display 11 based on the tally signal; wherein the tally display controller 44 determines the color emitted by the tally display 11 based on the voltage of the tally signal. According to this configuration, only one signal line is required to change the emitted color of the tally display 11. For example, when the voltage of the tally signal is 2 to 4 V, the tally display 11 emits green light and when the voltage of the tally signal is 5 V or more, the tally display 11 emits red light. In general, the tally display in green indicates that the switcher intends to use a video signal from the video camera coupled to the view finder device A soon, and the tally display in red indicates that a video signal from the video camera coupled to the view finder device A is currently in use.

Furthermore, the view finder device A preferably includes a video display adjuster 8 for adjusting a peaking level, a bright level and a contrast level; a memory 7 for storing the states adjusted by the video display adjuster 8, and a video display setting selector 45 for selecting setting stored in memory 7. According to this configuration, a camera operator may store preferred video settings in memory 7, and subsequently retrieve the preferred settings even after another camera operator changed the video settings.

Preferably the camera video signal and the interrupt video signal are each an HD-SDI video signal, and the view finder device A includes an audio signal separator 9 for separating an embedded audio signal from the HD-SDI video signal, a DA converter 41 for converting the embedded audio signal, which is a digital signal, into an analog signal, and an analog audio output 42 for outputting the converted analog signal. A conventional view finder does not include an audio output, and separate cable connections are required to listen to a return sound or an on-air sound. In contrast, according to the present invention, it is possible to listen to a return sound and an on-air sound without such separate cable connections.

Furthermore, the view finder device A may include a camera video signal output for outputting a camera video signal inputted into the camera video signal input 4. The camera video signal outputted from the camera video signal output may be inputted into an external apparatus such as a switcher.

Appearance, and Configurations of Connectors and Display on the Front Side of View Finder Device A Next, appearance, and configurations of connectors and a display of the view finder device A are described.

As shown in FIG. 2, the view finder device A includes, on the front side, a box-shaped main body 10. On the main body 10 are an LCD display 12, a tally display 11, a brightness adjuster 15, a contrast adjuster 14, a peaking adjuster 13, and an audio volume adjuster 16.

The functional blocks shown in FIG. 1 are preferably included in the main body 10. A video selected by the video selector 5 is displayed on the LCD display 12 under the conditions that a peaking level, a bright level, and a contrast level are determined by the video display adjuster 8, and under the control of the display controller 6. The tally display 11 emits light in a color determined by the tally display controller 44 based on the tally signal.

The brightness adjuster 15, the contrast adjuster 14, and the peaking adjuster 13 are generally referred to as "video display adjusters", and are used to adjust a bright level, a contrast level, and a peaking level (hereinafter referred to as "video display levels"), respectively. When these adjusters are modified, each video display level is numerically displayed for several seconds in the LCD display 12 as shown by reference symbols 29, 30, 31. The level display can be discretionarily set in user mode. Preferably, when these adjuster are pushed, LEDs 26, 27, 28 are turned off, and the mode is changed into a preset mode (fixed standard setting level). The video display adjuster 8 adjusts the video display level based on inputs from these video display adjusters. Because video display levels are thus adjusted in the view finder device A, video display levels can be precisely adjusted irrespective of a manufacturer or a model of a video camera, for monitoring. Therefore, an appropriate video image may be displayed on the display 12 even when a different video camera is used. The audio volume adjuster 16 adjusts the audio volume outputted from the audio output 42.

Appearance, and Configurations of Connectors and Display on the Backside of View Finder Device A Next, appearance, and configurations of connectors and a display on the backside of the view finder device A are described.

As shown in FIG. 3, on one embodiment, the view finder device A includes, on the backside, a tally display 17, a camera video signal input connector 18, an interrupt video signal input connector 19 for receiving a return video from a switcher, a first tally input connector 20, a second tally input connector 21, a remote controller input connector 22, a remote controller through-output connector 23, an audio output terminal 24, and audio output terminal 25.

The tally display 17 emits light in a color determined by the tally display controller 44 based on the tally signal. The camera video signal input connector 18 is a connector for receiving a camera video signal, and the camera video signal is inputted into the camera video signal input 4 via the connector 18. The interrupt video signal input connector 19 is a connector for receiving an interrupt video signal (such as, by way of example, a video signal from a switcher), and the interrupt video signal is inputted into the interrupt video signal input 3. The first tally input connector 20 and the second tally input connector 21 are connectors for receiving signals for controlling the emission of the tally displays 11, 17, and usually signals from the switcher are inputted into the connectors 20 and 21.

Figure 6:
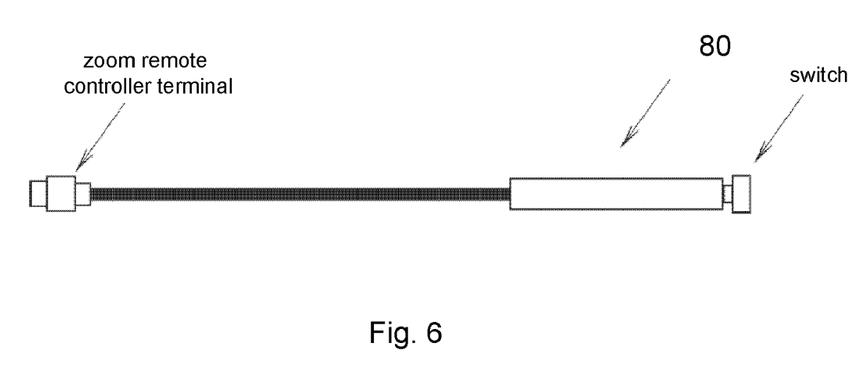
FIG. 6 is a front view illustrating a pen-type video-select switch device which can be used with a view finder device of an embodiment of the present invention.

The remote controller input connector 22 is a connector for mounting, on the view finder device A, a remote controller which is, in the original use, directly mounted to a video camera. The remote controller may be any remote controller which outputs signals for zoom adjustment, and start/stop switching, in addition to a video-select signal, and may be a pen-type switch remote controller 80, as shown in FIG. 6, which outputs a video-select signal.

The remote controller through-output connector 23 is a connector to output control signals inputted to the view finder device A after removing the video-select signal from the control signals, by control signal output module 2. The control signals outputted from this connector are inputted into a video camera (usually into a control signal input provided on a camera lens). The audio output terminals 24, 25 are terminals to output analog audio signals generated in the analog audio output 42.

Method of Using View Finder Device A

Figure 4:
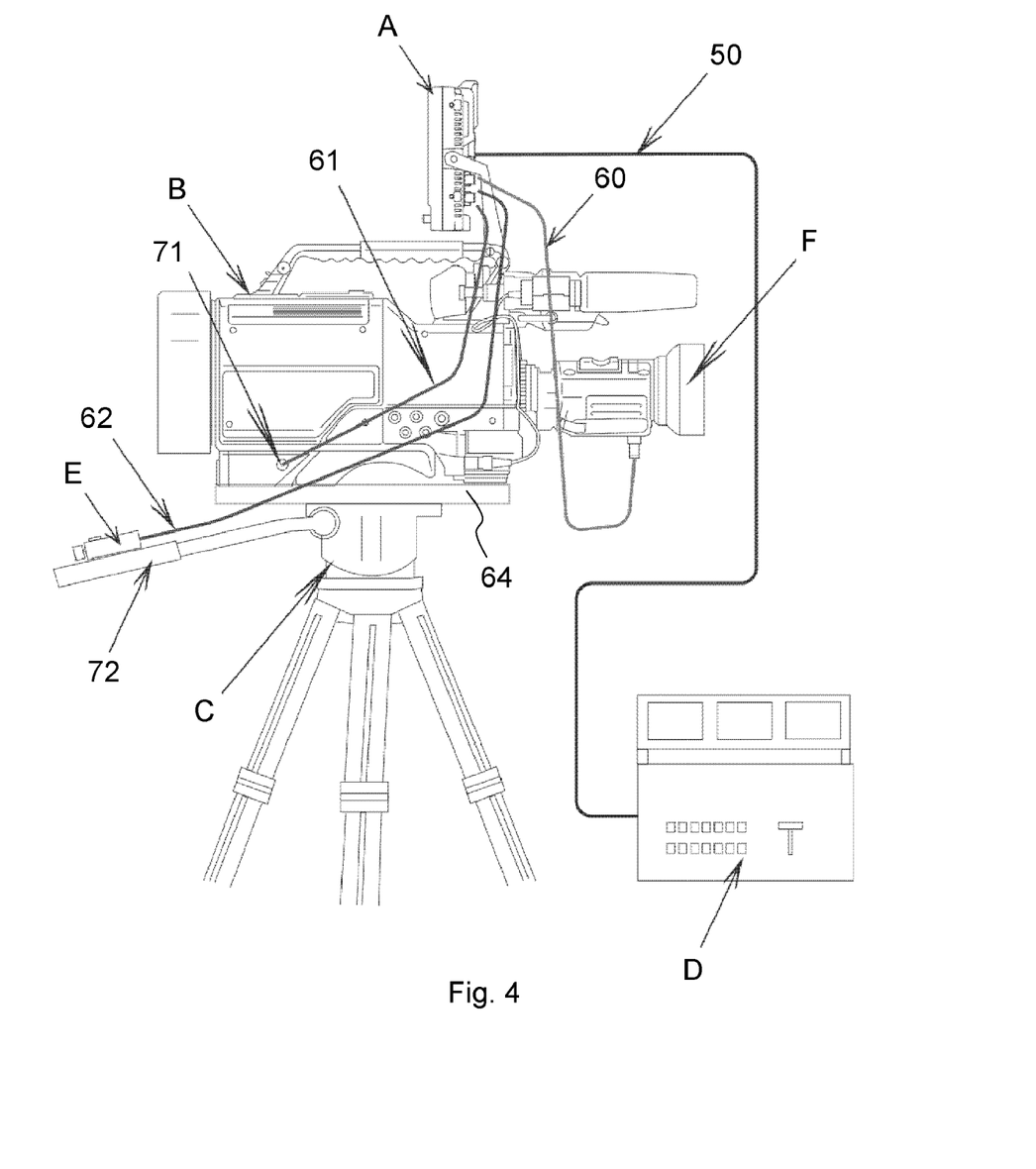
FIG. 4 is a connection diagram for connection of a view finder device of an embodiment of the present invention.

Next, with reference to FIG. 4, a method of using the view finder device A is described. In FIG. 4, a camera video signal from the camera video signal output terminal 71 is inputted into the camera video signal input connector 18 via a BNC cable 61. Furthermore, an interrupt video signal from a switcher D etc. is inputted into the interrupt video signal input connector 19 via a BNC cable 50. Furthermore, control signals from the zoom remote controller E mounted on a pan bar 72 of a video tripod C are inputted into the zoom remote controller input terminal 22 via a zoom remote controller cable 62. Furthermore, output signals from the zoom remote controller through-output connector 23, which are signals generated by removing the video-select signal from the control signals, are inputted into a zoom remote controller input terminal of a camera lens F via a zoom remote controller cable 60.

When the view finder device A and the peripheral apparatuses are thus connected, the video-select signal outputted from the remote controller E is inputed into the view finder device A, not a video camera, and a current video of the video camera and a return video from a switcher are switched based on the video-select signal. Therefore, the view finder device A enables an ordinary video camera not capable of receiving a return video from a switcher to receive the return video, and thus it becomes possible to use the ordinary video camera for broadcast use.

Method of Mounting View Finder Device A

In an embodiment, the view finder device A includes a screw hole on the bottom, and it is mounted to the top of the video camera B by a screw. However, according to this mounting method, blurring of the video image becomes more likely as the view finder device A with a heavy weight is mounted on the video camera B.

Figure 7A:
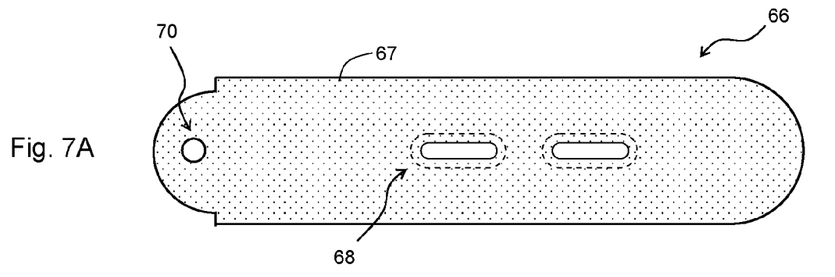
FIGS. 7A and 7B are a plan view and a side view, respectively, of a fixture adapter used for coupling a view finder device of an embodiment of the present invention.
Figure 7B:
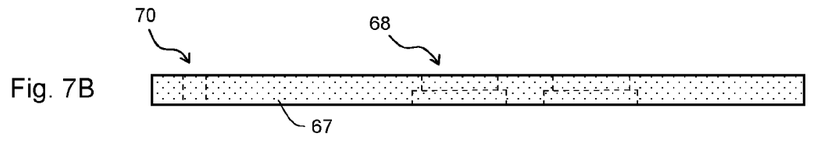
Figure 12:
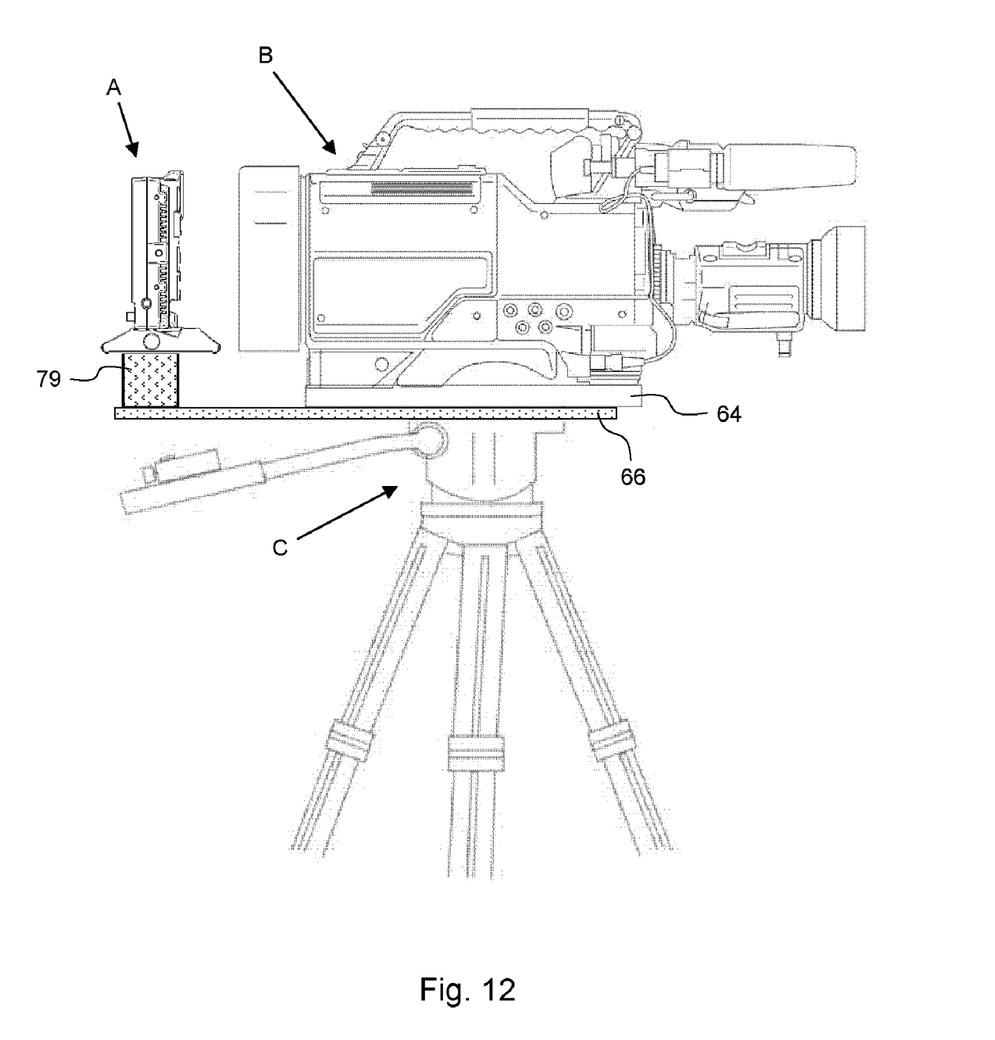
FIG. 12 is a side view illustrating a view finder device mounted to a camera by use of the fixture adapter of FIGS. 7A and 7B.
Figure 14:
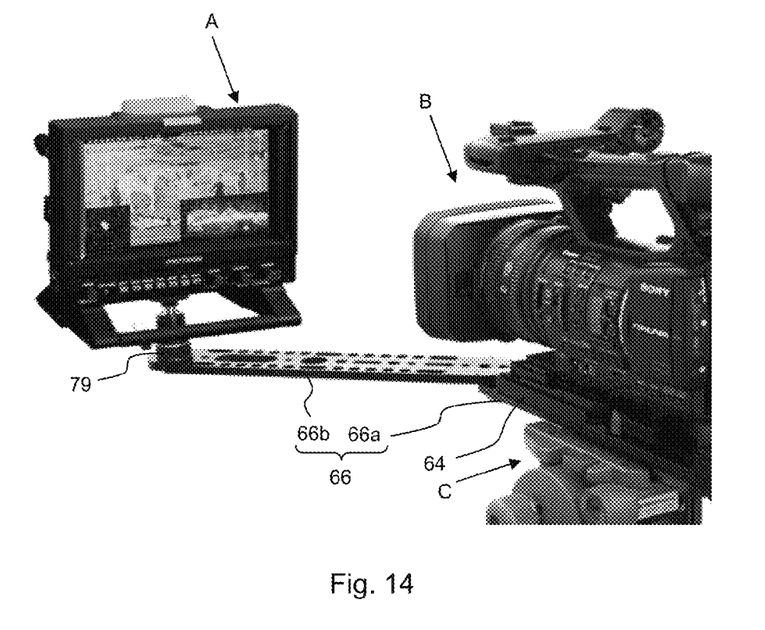
FIG. 14 is a side view illustrating a view finder device mounted by use of the fixture adapter of FIG. 13.

This problem can be solved by using a fixture adapter 66, such as shown in FIGS. 7A and 7B, for mounting the view finder device (hereinafter referred to as "a view finder adapter"). The view finder device A is mounted on the plate-shaped view finder adapter 66 interposed between the tripod C and the video camera adapter 64, as shown in FIGS. 12 and 14. Therefore, because the view finder device A is not mounted on the video camera B, image blurring can be reduced.

The mounting method by use of the view finder adapter 66 is explained in detail below. The view finder adapter includes a plate-shaped main body 67 to be interposed between the tripod C and the video camera adapter 64; wherein the main body 67 includes a mounting hole 68 for coupling the main body 67 to the tripod C and the video camera adapter 64, and a view finder device mounting portion 70 provided on an end of the main body 67 for mounting the view finder device A.

In general, a tripod adapter 73 is removably mounted to the tripod C. The tripod adapter 73, the view finder adapter 66, and the video camera adapter 64 are fixed to one another by screws, fastners, and the like.

Figure 8:
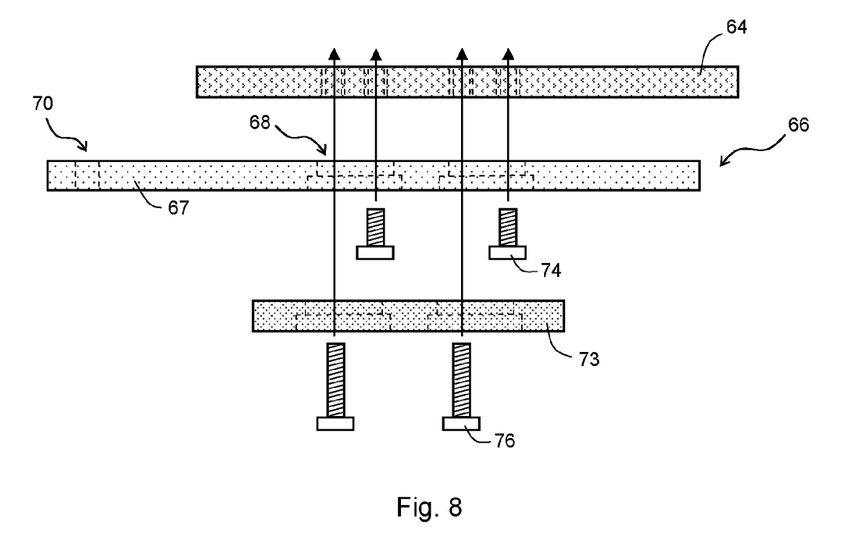
FIG. 8 is a side view illustrating a method of coupling the fixture adapter of FIGS. 7A and 7B with respect to a video camera adapter and a tripod adapter.
Figure 9:
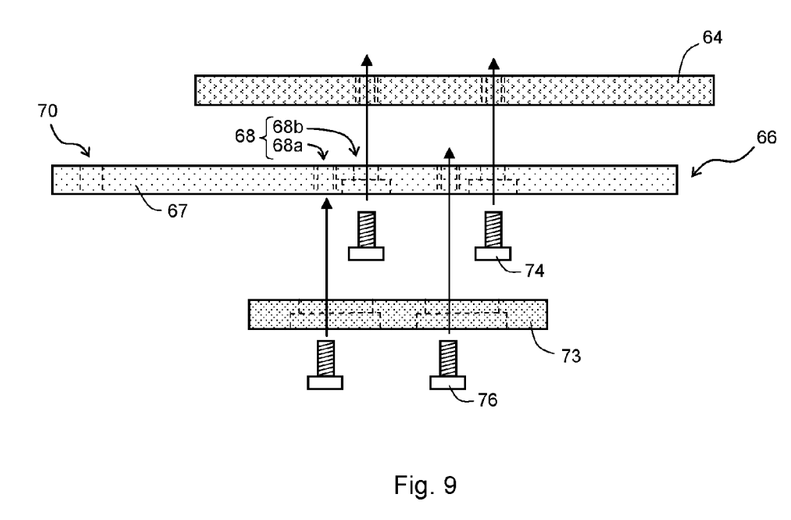
FIG. 9 is a side view illustrating another method of coupling the fixture adapter of FIGS. 7A and 7B with respect to a video camera adapter and a tripod adapter.

In an embodiment of the method of mounting these three adapters, as shown in FIG. 8, a screw 74 is inserted into a mounting hole 68 of the view finder adapter 66, and the screw 74 is further inserted into a screw hole of the video camera adapter 64 to be fastened such that the view finder adapter 66 and the video camera adapter 64 are fixed to each other. Next, a screw 76 is inserted into a through-hole of the tripod adapter 73 and the mounting hole 68 and then the screw 76 is inserted into a screw hole of the video camera adapter 64 to be fastened so that the three adapters are fixed to one another. Furthermore, the screw 74 may be omitted and thus the three adapters can be fixed to one another only by the screw 76. Furthermore, as shown in FIG. 9, the view finder adapter 66 may includes a screw hole 68a and a non-threaded hole (so-called "clearance hole") 68b as mounting holes 68. In this case, the view finder adapter 66 and the video camera adapter 64 are fixed to each other by use of the non-threaded hole 68b, and the tripod adapter 73 and the view finder adapter 66 are fixed to each other by use of the screw hole 68a. The method of fixing the three adapters to one another is not limited to the methods disclosed herein, and other physical or chemical method may be employed.

Figure 10:
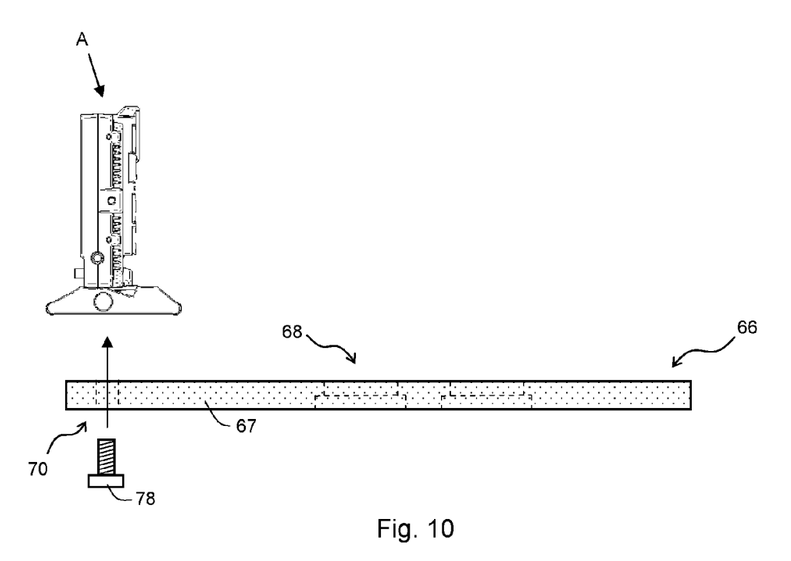
FIG. 10 is a side view illustrating a method of coupling a view finder device to the fixture adapter of FIGS. 7A and 7B.
Figure 11:
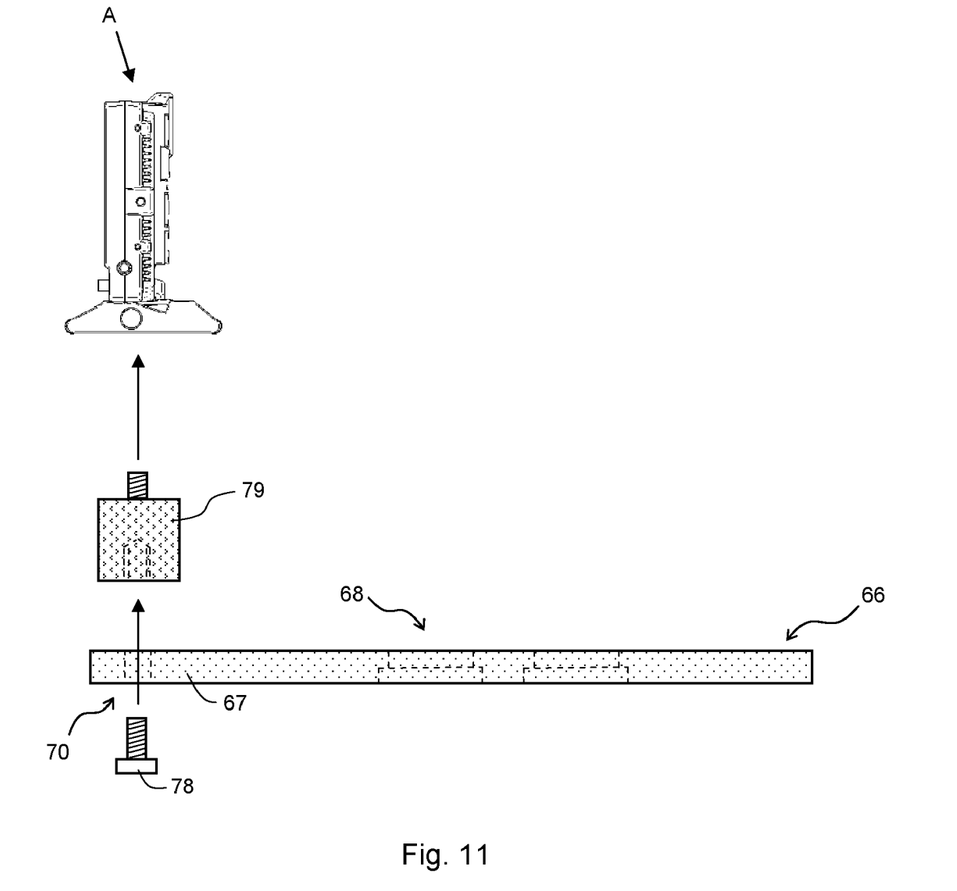
FIG. 11 is a side view illustrating a method of coupling a view finder device to the fixture adapter of FIGS. 7A and 7B by use of a height adjustment platform.

The view finder device A is mounted to the view finder adapter 66 at a view finder device mounting portion (hereinafter referred to as "mounting portion") 70. The mounting portion 70 comprises, by way of example, a non-threaded hole, and the view finder device A is fixed to the view finder adapter 66 by inserting a screw 78 into this hole and inserting and fastening the screw 78 to a screw hole on the bottom of the view finder device A as shown in FIG. 10. In another embodiment, the view finder device A is mounted to the view finder adapter 66 via a height adjustment platform 79 as shown in FIG. 11.

FIG. 12 shows a view finder device A mounted to the view finder adapter 66, which is interposed and fixed between the tripod C and the video camera adapter 64, via the height adjustment platform 79. In FIG. 12, the view finder device A is mounted on the rear side of the video camera B.

In another embodiment, the view finder device A can be fixed on a side of the video camera B. Hereinafter, this embodiment will be explained.

Figure 13:
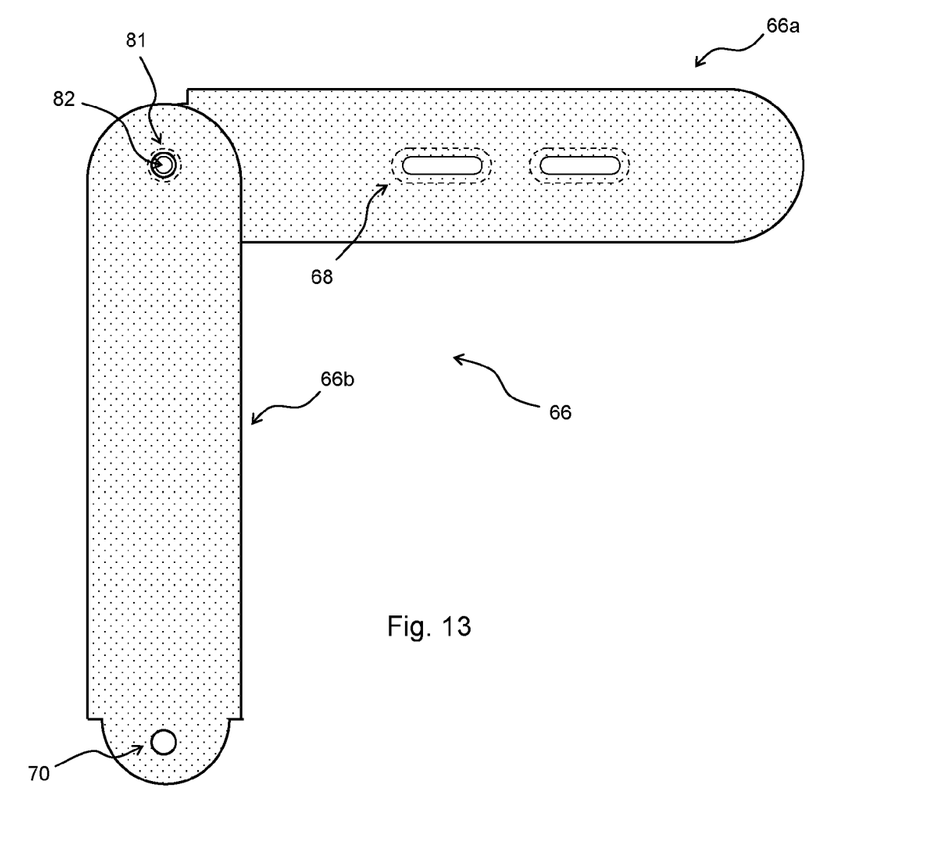
FIG. 13 is a plan view illustrating a fixture adapter comprised of two members.

In the present embodiment, two members are, in combination, used as a single view finder adapter 66 as shown in FIG. 13. Of the two members, a member having a mounting hole 68 is referred to as a first member 66a, and a member having a mounting portion 70 is referred to as a second member 66b. A non-threaded hole is provided on one end of the first member 66a, and a screw hole 82 is provided on an end opposite to the end of the mounting portion 70 of the second member 66b. The first member 66a and the second member 66b are connected to each other by inserting a screw into the holes 81, 82. Alternatively, a screw hole is provided on the first member 66a, and a non-threaded hole is provided on the second member 66b. Furthermore, the first member 66a and the second member 66b may each have a non-threaded hole, and the first member 66a and the second member 66b may be connected by a bolt and a nut.

The view finder adapter 66 of the present embodiment is fixed to the tripod adapter 73 and the video camera adapter 64 at the mounting hole 68 of the first member 66a. The view finder device A is mounted to the view finder adapter 66 at the mounting portion 70 of the second member 66b. Because the first member 66a and the second member 66b are connected to each other by a screw, the second member 66b is rotatable with respect to the first member 66a around the screw.

Because the view finder adapter 66 of the present embodiment has the above-mentioned configuration, the view finder device A can be mounted on the side of the video camera B as shown in FIG. 14.

Figure 15:
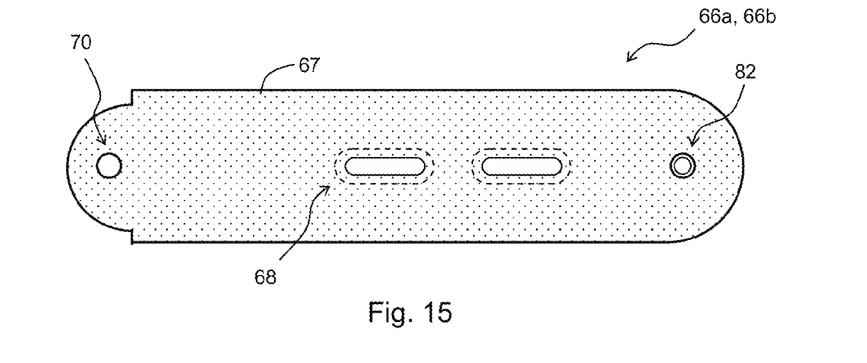
FIG. 15 is a plan view illustrating another embodiment of a member for the fixture adapter of FIG. 13.

In FIG. 13, the first member 66a and the second member 66b have different configurations from each other. However, the first member 66a and the second member may have the same configuration by providing a mounting portion 70, a mounting hole 68, a screw hole 82 in one member as shown in FIG. 15. In this case, the number of part types which require manufacturing can be reduced.

Another Embodiment of View Finder Device A

Figure 16:
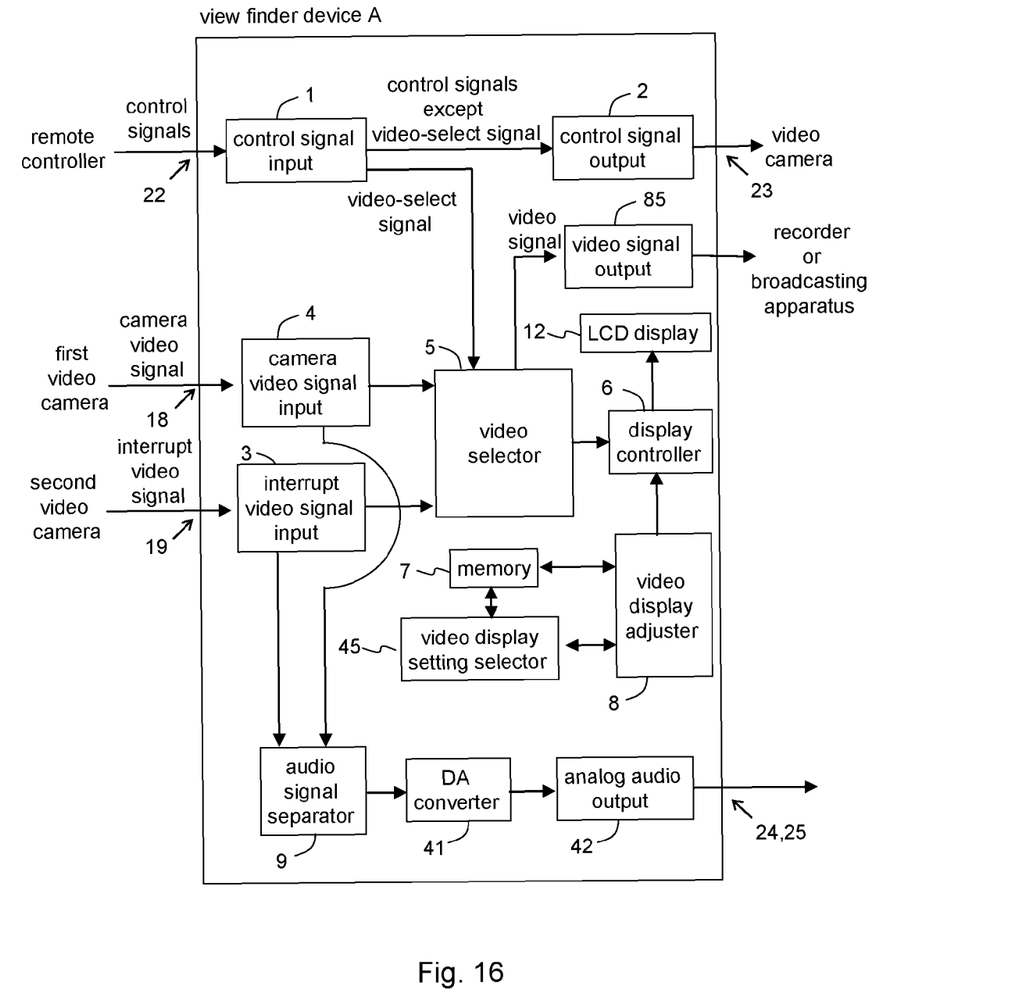
FIG. 16 is a block diagram illustrating an internal configuration of a view finder device of another embodiment of the present invention.

Another embodiment of the view finder device A is explained with reference to FIG. 16. The view finder device A of the present embodiment is similar to the above embodiment, but differs therefrom by including a video signal output 85 for outputting a video signal selected by the video selector 5 and a video signal from another video camera is inputted to the interrupt video signal input 3. Hereinafter, a video camera on which the view finder device A is mounted is referred to as "a first video camera", and the other video camera is referred to as "a second video camera." A video signal output connector may be provided on a backside of the view finder device A, and a video signal from the video signal output 85 may be outputted from the connector.

According to the configuration of the present embodiment, a camera operator of the first video camera can switch, by use of the zoom remote controller E, a video displayed on the LCD display 12 between a video from the first video camera and a video from the second video camera, and can output the video displayed on the LCD display 12. The outputted video can be inputted into and recorded in a recorder, or can be inputted into a broadcasting apparatus. Thus, the video signal from the first camera or the second camera may be outputted for recording or broadcast, as selected by the video-select signal. Therefore, by use of the view finder device A of the present embodiment, a video generated by combining videos from a plurality of video cameras can be created without using a separate switcher. Thus the use of a switcher is obviated by utilizing the described embodiment.

In place of a video from the second video camera, a video from a video reproduction apparatus which reproduces a recorded video may be inputted into the interrupt video signal input 3. In this case, a video generated by combining an already-recorded video and a currently acquired video may be created. Conventionally, creating a video which uses a plurality of video cameras, requires more people and apparatuses than the number offered by using of the view finder device A of the present embodiment.

What is claimed is:

1. A view finder device comprising:
   a control signal input for receiving control signals including a video-select signal;
   a camera video signal input for receiving a camera video signal from a video camera;
   an interrupt video signal input for receiving an interrupt video signal from a video interrupt source which is different from the video camera;
   a video selector for displaying either the video of the camera video signal or the video of the interrupt video signal, in accordance with the video-select signal;
   a display controller for controlling display of a video selected by the video selector; and
   a control signal output for outputting the control signals after the video-select signal is removed therefrom.

2. The device as claimed in claim 1, wherein the control signal input is configured to receive the control signals from a zoom remote controller coupled thereto.

3. The device as claimed in claim 1, wherein the camera video signal input utilizes a BNC connector.

4. The device as claimed in claim 1, further comprising a tally signal input for receiving a tally signal from the interrupt video signal; a tally display for emitting light with a plurality of colors; and a tally display controller for controlling the tally display based on the tally signal; wherein the tally display controller determines a color emitted in the tally display in accordance with the voltage of the tally signal.

5. The device as claimed in claim 1, further comprising a video display adjuster for adjusting at least one of a peaking level, a brightness level and a contrast level.

6. The device as claimed in claim 5, further comprising:
   a memory for storing at least one setting of the video display adjuster; and,
   a video display setting selector for selecting between an initial setting and the at least one stored setting.

7. The device as claimed in claim 1, wherein the camera video signal and the interrupt video signal comprise each an HD-SDI video signal, further comprising:
   an audio signal separator for separating an embedded digital audio signal from the HD-SDI video signal;
   a digital to analog (D/A) converter for converting the embedded digital audio signal, into an analog signal; and,
   an analog audio output for outputting the analog signal.

8. The device as claimed in claim 1, wherein the video interrupt source is a video switcher.

9. The device as claimed in claim 1, further comprising a video signal output for outputting a video signal selected by the video selector.

10. The device as claimed in claim 9, wherein the video interrupt source is another video camera or a video reproduction apparatus.

11. The device as claimed in claim 9, wherein the video signal output outputs the video signal to a recorder or a broadcasting apparatus.

12. The device as claimed in claim 1, wherein the interrupt video signal input connector comprises a BNC connector.

* * * * *